US011327962B1

(12) United States Patent
Borthakur et al.

(10) Patent No.: US 11,327,962 B1
(45) Date of Patent: *May 10, 2022

(54) REAL-TIME ANALYTICAL DATABASE SYSTEM FOR QUERYING DATA OF TRANSACTIONAL SYSTEMS

(71) Applicant: Rockset, Inc., San Mateo, CA (US)

(72) Inventors: Dhruba Borthakur, Sunnyvale, CA (US); Venkat Venkataramani, Palo Alto, CA (US); Tudor Bosman, Hayward, CA (US); Igor Canadi, San Francisco, CA (US); Shruti Bhat, Newark, CA (US); Kshitij Wadhwa, San Mateo, CA (US); Haneesh Reddy Poddutoori, San Mateo, CA (US)

(73) Assignee: Rockset, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/812,923

(22) Filed: Mar. 9, 2020

Related U.S. Application Data (60) Provisional application No. 62/964,971, filed on Jan. 23, 2020.

(51) Int. Cl.
*G06F 7/00* (2006.01)
*G06F 16/23* (2019.01)

(52) U.S. Cl.
CPC ................ *G06F 16/2386* (2019.01)

(58) Field of Classification Search
CPC .... G06F 16/2386; G06F 16/81; G06F 16/835; G06F 16/93; G06F 16/951
See application file for complete search history.

(56) References Cited

U.S. PATENT DOCUMENTS

| | | | | |
|---|---|---|---|---|
| 6,496,843 B1 * | 12/2002 | Getchius | ............... | G06F 16/957 715/210 |
| 6,611,840 B1 * | 8/2003 | Baer | ..................... | G06F 16/958 715/270 |
| 6,615,172 B1 * | 9/2003 | Bennett | ............. | G06F 16/24522 704/257 |
| 8,468,171 B2 * | 6/2013 | Nishiyama | .............. | G06F 16/80 707/793 |
| 9,471,711 B2 * | 10/2016 | Abadi | ............... | G06F 16/90335 |

(Continued)

*Primary Examiner* — Mohammed R Uddin
(74) *Attorney, Agent, or Firm* — Fenwick & West LLP (57) ABSTRACT

A real-time analytical database system allows queries on data obtained from a transactional system that is frequently updated by the transactional system. The real-time analytical database system receives change logs from the transactional system. The change logs describe operations performed by the transactional system. The real-time analytical database system stores a plurality of indexes in a key-value store, each index comprising key-value pairs. A key of a key-value pair is obtained by combining field data describing a field of a document. The real-time analytical database system determines modifications to the key-value pairs of the key-value store corresponding to the operations of the transactional system as represented by the received change logs. The real-time analytical database system receives and processes queries using the plurality of indexes. The real-time analytical database system builds key-expressions based on the criteria of queries and uses the indexes to find key-value pairs matching the key-expression.

22 Claims, 6 Drawing Sheets

(56) References Cited

U.S. PATENT DOCUMENTS

| | | | |
|---|---|---|---|
| 9,830,319 B1* | 11/2017 | Tortosa | G06F 16/86 |
| 9,886,483 B1* | 2/2018 | Harrison | G06F 16/24544 |
| 10,592,525 B1* | 3/2020 | Khante | G06F 16/245 |
| 10,853,182 B1* | 12/2020 | Vig | G06F 11/2023 |
| 10,885,009 B1* | 1/2021 | Anghel | G06F 16/2343 |
| 10,901,973 B1* | 1/2021 | Senra | G06F 16/23 |
| 11,030,242 B1* | 6/2021 | Borthakur | G06F 16/951 |
| 2005/0033777 A1* | 2/2005 | Moraes | G06F 16/27 |
| 2006/0242694 A1* | 10/2006 | Gold | H04L 63/1441 726/13 |
| 2013/0166568 A1* | 6/2013 | Binkert | G06F 16/901 707/741 |
| 2014/0279834 A1* | 9/2014 | Tsirogiannis | G06F 16/211 707/602 |
| 2014/0379638 A1* | 12/2014 | Li | G06F 16/27 707/610 |
| 2015/0088924 A1* | 3/2015 | Abadi | G06F 16/90335 707/769 |
| 2016/0085817 A1* | 3/2016 | Stowe | G06F 16/1744 707/693 |
| 2016/0127465 A1* | 5/2016 | Barstow | G06F 16/273 707/620 |
| 2016/0173617 A1* | 6/2016 | Allinson | H04L 67/02 709/227 |
| 2016/0253679 A1* | 9/2016 | Venkatraman | G06Q 30/0185 705/310 |
| 2017/0006135 A1* | 1/2017 | Siebel | H04L 69/40 |
| 2017/0060856 A1* | 3/2017 | Turtle | G06F 16/93 |
| 2017/0139914 A1* | 5/2017 | Newman | H04L 51/22 |
| 2017/0315683 A1* | 11/2017 | Boucher | G06F 3/0482 |
| 2018/0039663 A1* | 2/2018 | Sachdev | G06F 16/2272 |
| 2018/0096000 A1* | 4/2018 | Harrison | G06F 16/254 |
| 2018/0232422 A1* | 8/2018 | Park | G05D 23/1931 |
| 2018/0294952 A1* | 10/2018 | Yuan | G06F 21/6227 |
| 2018/0314726 A1* | 11/2018 | Bath | G06F 16/27 |
| 2018/0329967 A1* | 11/2018 | Lee | G06F 16/27 |
| 2018/0349463 A1* | 12/2018 | Bernhardy | G06F 16/9017 |
| 2018/0349482 A1* | 12/2018 | Oliner | H04L 41/0604 |
| 2019/0179948 A1* | 6/2019 | Benjamin-Deckert | G06F 16/2453 |
| 2019/0220468 A1* | 7/2019 | Hrle | G06F 16/283 |
| 2019/0340273 A1* | 11/2019 | Raman | H04L 47/762 |
| 2020/0104401 A1* | 4/2020 | Burnett | G06F 16/2477 |

* cited by examiner

REAL-TIME ANALYTICAL DATABASE SYSTEM FOR QUERYING DATA OF TRANSACTIONAL SYSTEMS

CROSS-REFERENCE TO RELATED APPLICATIONS

This application claims the benefit of U.S. Provisional Application No. 62/964,971, filed on Jan. 23, 2020, which is incorporated by reference in its entirety.

FIELD OF INVENTION

This disclosure relates generally to efficient execution of queries based on information stored in a data store, and more specifically to efficient execution of analytical queries based on data that is continuously being updated via transactional operations.

BACKGROUND

Enterprises use transactional data stores for storing data that is updated on a regular basis. These data stores are optimized for transactional updates. Accordingly, they are configured to efficiently execute frequently received update requests. Such data stores are not configured for efficient execution of analytics queries. For example, if a user wants to generate analytics report based on such data, the system is unable to generate such reports efficiently. Furthermore, generation of analytics reports would adversely affect the performance of the transactional data store, thereby slowing the update operations.

Conventional techniques for generating analytics reports based on data stored in such transactional stores transfer the data of the transactional data store to an analytics data store configured to efficiently execute analytics queries, for example, a data warehouse. The data transfer is performed via an extract, transform, and load (ETL) operation. An ETL operation is slow and is typically performed periodically, for example, once every few hours or once a day. Once the ETL operation is performed, users are able to execute analytics queries on the analytics data store. However, since the ETL operations are performed at a slow frequency, say once every few days or once a week, the analytics queries are unable to present the latest data of the transactional data store.

Another conventional technique for performing analytics queries based on transactional system uses the same system for performing both transactional operations as well as analytical queries but speeds up the processing by using faster hardware, for example, a system that can store large amount of data in memory. This solution requires expensive hardware for processing queries. The drawback of such technique is that the size of the database is limited by the amount of memory of the hardware used to process the data. If the size of the database is too large, the system is unable to store the entire data set in memory and the processing of the analytics queries becomes slow.

An example application where users want to see analytics reports of data that is frequently updated is the online gaming industry where hundreds and thousands of gamers interact with an online gaming system. A transactional store, tracks operations performed by the various gamers, for example, every move performed by a gamer. Users would like to view frequently updated reports that describe how the various gamers are performing, for example, the top scoring gamers. Conventional techniques can only provide the latest report at a low frequency, for example, once every few minutes or hours. This provides a poor user experience, since users would like to determine any changes in the top scoring gamers as soon as they happen.

SUMMARY

The above and other issues are addressed by a computer-implemented method, computer system, and computer readable storage medium for processing queries based on data obtained from a transactional system. According to some embodiments, a real-time analytical database system receives a set of change logs from a transactional system. The change logs represent operations performed on data stored in the transactional system. The real-time analytical database system stores data matching the transactional system and updates it using the change logs. In some embodiments, the real-time analytical database system receives information from multiple transactional systems.

The real-time analytical database system repeats the following steps for each change log received. An operation of the transactional system represented by the change log is determined. The real-time analytical database system determines one or more key-value pairs corresponding to the operation. The real-time analytical database system updates a plurality of indexes stored in a key-value store using the key-value pairs. In an embodiment, the plurality of indexes includes: (1) a document index configured to identify documents matching a criteria based on fields, (2) a field index configured to access fields of a given document, and (3) a columnar index configured to determine aggregate values associated with fields. A document index may also be referred to as an inverted index.

The real-time analytical database system further receives a query requesting information of the transactional system from a query source. The real-time analytical database system generates a key-expression based on criteria specified in the query and accesses the requested information by identifying key-value pairs matching the key-expression. The accessed information is transmitted to the query source. The use of change logs and the plurality of indexes allows the real-time analytical database system to process analytics queries or other queries based on the data of the transactional system fast, for example, within a few seconds of any updates made in the transactional system.

In an embodiment, the real-time analytical database system performs a bulk import operation to retrieve data of the transactional system as follows. The real-time analytical database system receives a change log sequence number associated with a change log from the transactional system. Responsive to receiving the change log sequence number, the real-time analytical database system performs a bulk import of data of the transactional system. The real-time analytical database system sends a request to receive change logs starting from the change log sequence number and processes the received change logs, for example, as described by the method above.

The key-value pairs of the indexes are generated as follows. Each field has a field name, a field type, and a field value. The keys of document indexes are obtained by combining the field name, the field type, the field value, and an identifier identifying the record. The key-value pair of the columnar index, is generated as follows: the key is obtained by combining the field name, the field type, and the document identifier, and the value represents the field value. The key-value pair of the field index, is generated as follows: a key is obtained by combining the document identifier and the field name, and the value represents the field value.

The queries are executed by generating an appropriate key expression and identifying matching key-value pairs of an index. For example, the real-time analytical database system may receive a query requesting documents having a specified value of a specified field type for a specified field name. The real-time analytical database system generates a key-expression by combining the specified field name, the specified field type, and the specified field value and identifies key-value pairs matching the key-expression in the document index.

The real-time analytical database system may receive a query requesting one or more fields of a document, the criteria specifying a document. The real-time analytical database system generates the key-expression comprising a document identifier for the specified document and identifies key-value pairs matching the key-expression using the field index.

The real-time analytical database system may receive a query requesting an aggregate of a field of a specified field name having a specified field type across a set of documents. The real-time analytical database system generates the key-expression by combining the specified field name and the specified field type. The real-time analytical database system identifies key-value pairs matching the key-expression using the columnar index.

Embodiments of a computer readable storage medium store instructions for performing the steps of the above methods. Embodiments of the computer system comprise one or more computer processors and a computer readable storage medium store instructions for performing the steps of the above methods.

The features and advantages described in this summary and the following detailed description are not all-inclusive. Many additional features and advantages will be apparent to one of ordinary skill in the art in view of the drawings, specification, and claims hereof.

BRIEF DESCRIPTION OF THE DRAWINGS

The teachings of the embodiments can be readily understood by considering the following detailed description in conjunction with the accompanying drawings.

The figures depict various embodiments of the present invention for purposes of illustration only. One skilled in the art will readily recognize from the following discussion that alternative embodiments of the structures and methods illustrated herein may be employed without departing from the principles of the invention described herein.

DETAILED DESCRIPTION

System Environment

Figure 1:
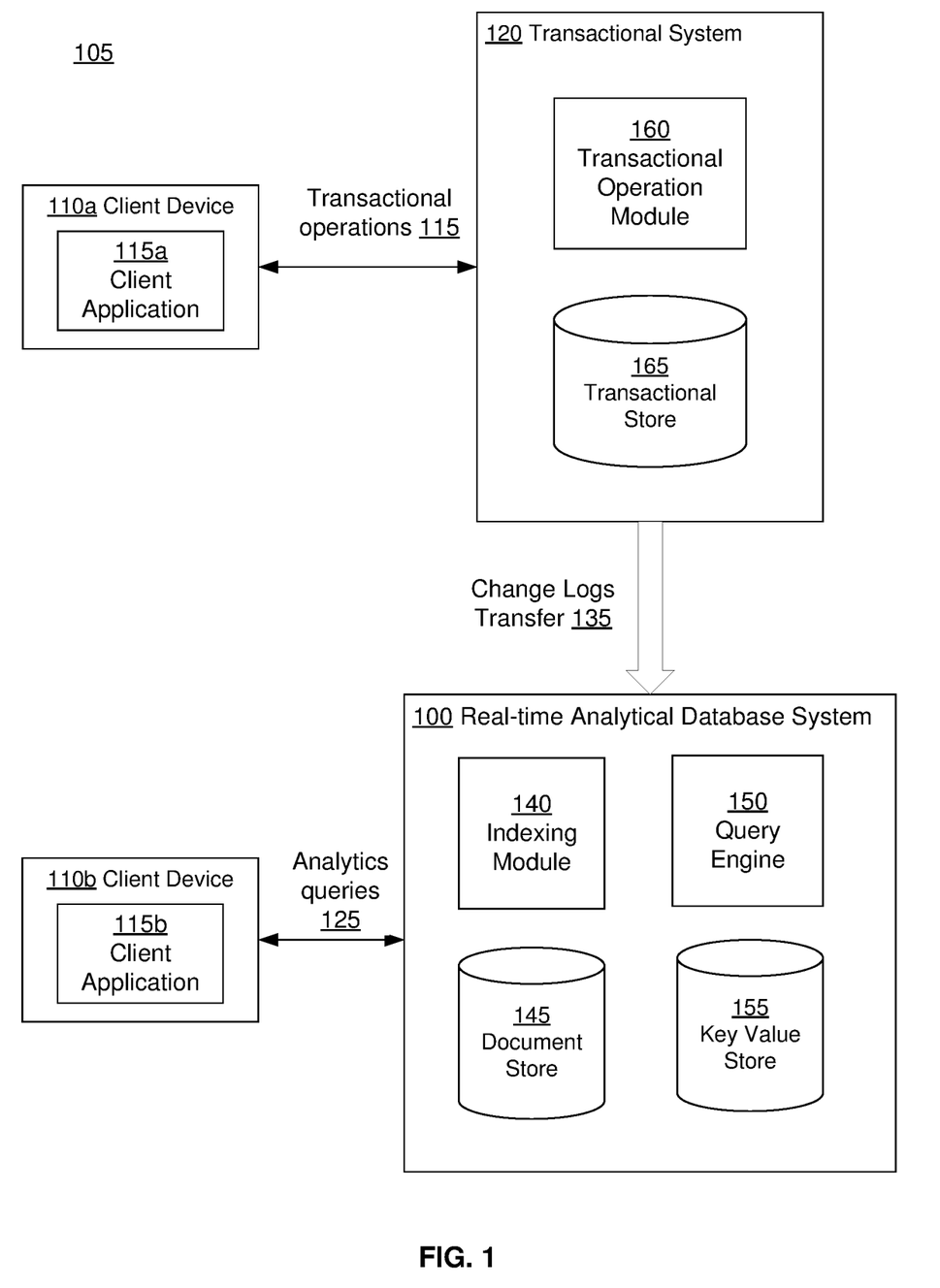
FIG. 1 is a block diagram of a system environment for performing analytics queries on data of a transactional system, in accordance with an embodiment.

FIG. 1 is a block diagram of a system environment 105 for performing analytics queries on data of a transactional system, in accordance with an embodiment. The system environment 105 comprises the real-time analytical database system 100, one or more client devices 110, and a transactional system 120. Other embodiments may have more of fewer systems within the system environment 105. Functionality indicated as being performed by a particular system or a module within a system may be performed by a different system or by a different module than that indicated herein.

FIG. 1 and the other figures use like reference numerals to identify like elements. A letter after a reference numeral, such as "110A," indicates that the text refers specifically to the element having that particular reference numeral. A reference numeral in the text without a following letter, such as "110," refers to any or all of the elements in the figures bearing that reference numeral (e.g. "110" in the text refers to reference numerals "110a" and/or "110n" in the figures).

The real-time analytical database system 100 receives change logs representing operations performed by the transactional system 120. The operations performed by the transactional system may represent changes to data, for example, addition of records, modifications of records, or deletion of records. The operations performed by the transactional system may represent changes to schema, for example, addition of fields or tables, modifications of tables, or dropping tables. The change logs of a transactional system may be automatically produced by the transactional system as part of the execution of the transactions. Alternatively, the change logs may be produced by a transactional system by executing an external script that sends one or more queries to the transactional system to compare data at two different time-points to determine the changes in the stored data. The analytics processing system 100 modifies indexes stored using a key-value pairs to reflect the changes of the transactional system. A user is able to query the data of the real-time analytical database system 100 after the key-value store is updated. The queries correspond to the modified data or schema of the transactional system. The real-time analytical database system 100 allows a user to query the data on a real-time basis, for example, within few seconds of the changes being made to the transactional system. Accordingly, a user can run analytics query based on changed data or changed schema of the transactional system within few seconds using the real-time analytical database system, for example, within less than 5 seconds.

The system environment 105 according to various embodiments offers several advantages over conventional systems. The system environment 105 performs the processing of the analytical queries in the real-time analytical database system 100 that is distinct from the transactional systems 120. This provide system isolation such that the analytical queries do not impact the transactional system. For example, analytical queries may require significant computing power and executing the analytical queries on the transactional system can affect the performance of the transactional system, thereby causing the users processing transactions using the transactional system 120 to wait. The system isolation provided by the system environment 105 avoids such impact of analytical queries on the transactional system 120. Furthermore, a transactional system 120 is optimized for efficiently executing transactions and is configured differently compared to an analytical system. Using the transactional system 120 for executing analytical queries requires the transactional system 120 to be configured differently in a manner that may not be optimal for executing transactions. The system isolation provided by the system environment 105 also helps alleviate this problem since the real-time analytical database system can be configured separate from the transaction system 120 and each system can be optimized independent of the other system.

The disclosed system of a transactional system 120 combined with the real-time analytical database system 100 is also referred to as operational analytics processing (OPAP) system. As an application, the disclosed system can be used to show leaderboards displaying top gamers in a gaming environment in real-time, as gamers are playing in an online environment. Similarly, the disclosed system can be used to execute queries in other applications, for example, transactional system being updated by data streams that may be received from other systems, transactional system being updated by sensor data, an online system such as a customer relationship management (CRM) system receiving user interactions performed by various uses, and so on.

The transactional system 120 comprises a transactional operation module 160 and a transactional store 165. The transactional store 165 stores records that may be updated. A record may be represented by a document in a document store and by one or more rows of tables in a relational database. In some embodiments, the transactional store is a document store storing documents comprising fields. In some embodiment, the transactional store is a relational database having a schema comprising tables (or relations). The tables store records comprising fields. Each table comprises one or more columns, each column storing values of a field.

The transactions operation module 160 receives requests to perform transactions and modifies the data stored in the transactional store 165 according to the received requests. The transactions performed by the transactions operation module 160 may cause changes to the records stored in the transactional store 165, for example, adding (or inserting) records, deleting records, and updating records by modifying one or more fields of existing records. The transactional system 120 may receive requests to perform schema changes. Examples of schema changes in a relational database include adding a table, dropping an existing table, or modifying a table. Other examples of schema changes include modifications performed to tables such as adding a new column to a table, deleting a column from a table, adding a constraint to a table, for example, a primary key constraint, not null constraint to a column, a foreign key constraint, and so on.

The transactional system 120 may store data in a cloud storage system. The transactional system may be a third-party system that stores documents locally in a storage of the third-party system 130 or in the cloud storage system. Examples of transactional systems include MYSQL, POSTGRES, DYNAMODB, MONGODB, and so on.

The system environment 105 may include multiple client devices 110. A client device 110 is a computing device such as a personal computer (PC), a desktop computer, a laptop computer, a notebook, or a tablet PC. The client device 110 can also be a personal digital assistant (PDA), mobile telephone, smartphone, wearable device, etc. The client device 110 can also be a server or workstation within an enterprise datacenter. The client device executes a client application 115 for interacting with the real-time analytical database system 100, for example, a browser. Although, FIG. 1 shows two client devices, the system environment 105 can include many more client devices 110.

The real-time analytical database system 100 comprises modules including an indexing module 140, a document store 145, a key value store 155 and a query engine 150. Other embodiments can include more or fewer modules in the real-time analytical database system 100.

The real-time analytical database system 100 receives data from external sources such as the transactional system 120 and stores them in document store 155 as documents comprising semi-structured data. The real-time analytical database system 100 may receive data from multiple transactional systems and allow users to perform analytical queries for each transactional system as well as analytical queries across the multiple transactional systems. The real-time analytical database system 100 receives records from relational databases and converts them into documents and stores them in the document store 145. For example, the real-time analytical database system 100 may convert each row of a table into a document and store the document in the document store 145. The real-time analytical database system 100 may receive documents sent by applications executing on systems such as client devices 110. The real-time analytical database system 100 creates indexes based on the retrieved documents to allow efficient querying using the documents.

The real-time analytical database system 100 stores information describing records as semi-structured documents. The real-time analytical database system 100 performs queries across semi-structured data although the techniques disclosed herein can be used for structured and unstructured data. Semi-structured data is a form of structured data that does not conform to a formal structure of data, for example, schemas of relational databases. Semi-structured data contains metadata such as tags or other markers to separate various elements of the documents and enforce hierarchies of records and fields within the document. Semi-structured data can be represented using a particular type of format, for example, hypertext markup language (HTML), the extensible markup language (XML), JAVASCRIPT object notation (JSON), PDF, MICROSOFT WORD, documents based on comma separated variable (CSV), tab-delimited text files, and so on. A semi-structured document is a document that stores semi-structured data.

A semi-structured document includes one or more fields. A field may also be referred to as an attribute. In an embodiment, a semi-structured document is represented as key-value pairs. A field comprises field data, for example, a field name, a field value, and a field type. For example, a semi-structured document representing data describing a person may include a field with name "first_name", a field value "Jack" and field type "string".

Different semi-structured documents may have different fields. Furthermore, a field with the same name in two different semi-structured documents may store data of different types. For example, a document D1 may have fields a1 and a2 whereas document D2 may have fields a1 and a3. Furthermore, the field a1 in document D1 may store data of type integer whereas field a1 in document D2 may store data of type string.

The real-time analytical database system 100 is configured to automatically sync data from various external sources and continuously index them in the key-value store 155. The queries processed by the query engine 150 return the appropriate results available in the key-value stores when the query is executed. For example, a query that requests documents matching a criteria may be received at time T1 and again at time T2. The query execution at time T1 may return a set S1 of documents. However, if the real-time analytical database system 100 receives additional records from the transactional system 120 between the time T1 and time T2, the execution of the query at time T2 may return a set S2 that reflects any matching documents received between the time T1 and T2.

The indexing module 140 creates indexes used by the query engine 150 for performing efficient queries for data stored in the documents. The indexing module 140 stores the generated indexes in the key-value store 155. The indexing module 140 receives semi-structured documents comprising fields and adds key-value pairs based on fields of the documents in the key-value store 155. In an embodiment, a key is represented as a string. A key-value pair stored in the key-value store 155 is also referred to herein as a record. The key-value store 155 stores a plurality of indexes based on the documents received. In an embodiment, the key-value store 155 stores key-value pairs in a sorted order of keys, for example, alphabetically sorted order.

The query engine 150 receives queries from client applications 115 executing on client device 110s. The query may be specified using a query language such as the structured query language, SQL. The query engine 150 processes a received query using indexes stored in the key-value store 155 and returns the results to the client application 115 that sent the query.

The key-value store 155 allows the real-time analytical database system 100 to store semi-structured data that does not conform to a rigid schema. For example, documents with different fields can be added to the key-value store by splitting each document into individual key-value pairs, each key-value pair representing a field. In contrast, a relational database requires all records to have the same structure to be able to be added to a table. Furthermore, the key-value store 155 allows efficient searches for keys, for example, keys matching a given prefix. The indexing module 140 creates indexes having different key structures that allow different types of queries to be executed efficiently. As a result the real-time analytical database system 100 is able to perform more efficient querying than a query engine that uses a simple inverted index that maps keywords to documents.

The real-time analytical database system 100 creates different types of indexes to perform different types of queries. Examples of different types of queries include: query for documents that have fields having a particular name and particular value, query for fields of a given document having a document identifier, query to aggregate data of fields matching a given criteria, and so on. Each index created by the real-time analytical database system 100 combines field data and/or document identifiers in a particular order to generate key-value pairs for the index. The order in which field data and document identifier are combined for an index allow efficient execution of a particular type(s) of queries.

Assume that an index I1 combines values associated with the field in the following order: field name, field type, and document identifier to obtain keys. This index is configured to allow efficient access to all occurrences of fields having a particular name and optionally a field type. For example, assume that the query engine 150 needs to search for all documents with field name "A1" independent of the field type and the document. The query engine 150 generates a key-expression "A1" and searches for all key-value pairs having a prefix matching the generated key-expression. This prefix search matches all occurrences of field "A1" independent of the field type and document.

As another example, assume that the query engine 150 needs to access all occurrences of fields having field name "A1" and field type T1. The query engine 150 generates a key expression that combines value "A1" and "T1" and searches for all key-value pairs having a prefix matching the generated key-expression. This prefix search returns all occurrences of field "A1" with field type "T1". As another example, assume that the query engine 150 needs to access the field having field name "A1" and field type T1, from a specific document having identifier "ID1". The query engine generates a key expression that combines the strings "A1", "T1", and "ID1" and searches for the key-value pair having a prefix matching the generated key-expression.

Another index, for example, index I2 may combine the field data and document identifier values in a different order. For example, index I2 may combine field name, field value, and document identifier in this particular order to obtain keys of key-value pairs. The query engine 150 may use index I2 to search for all documents that have a particular value "V1" of a particular field "A1". The query engine 150 performs such a search by generating a key-expression by combining the field name "A1" and the field value "V1" and performing a prefix search for the generated key-expression in the index I2. The prefix search would match all occurrences of fields with name "A1" and value "V1" independent of the document identifier.

A network (not shown in FIG. 1) enables communications between various systems within the system environment 105, for example, communications between the client device 110 and the real-time analytical database system 100, communications between the transactional system 120 and the cloud storage system 120, and so on. In one embodiment, the network uses standard communications technologies and/or protocols. The data exchanged over the network can be represented using technologies and/or formats including, the HTML, the XML, JSON, and so on.

Systems and methods for indexing and querying semi-structured documents using a key value store are described in U.S. patent application Ser. No. 16/160,477 filed on Oct. 15, 2018, which is incorporated by reference herein in its entirety.

System Architecture

Figure 2:
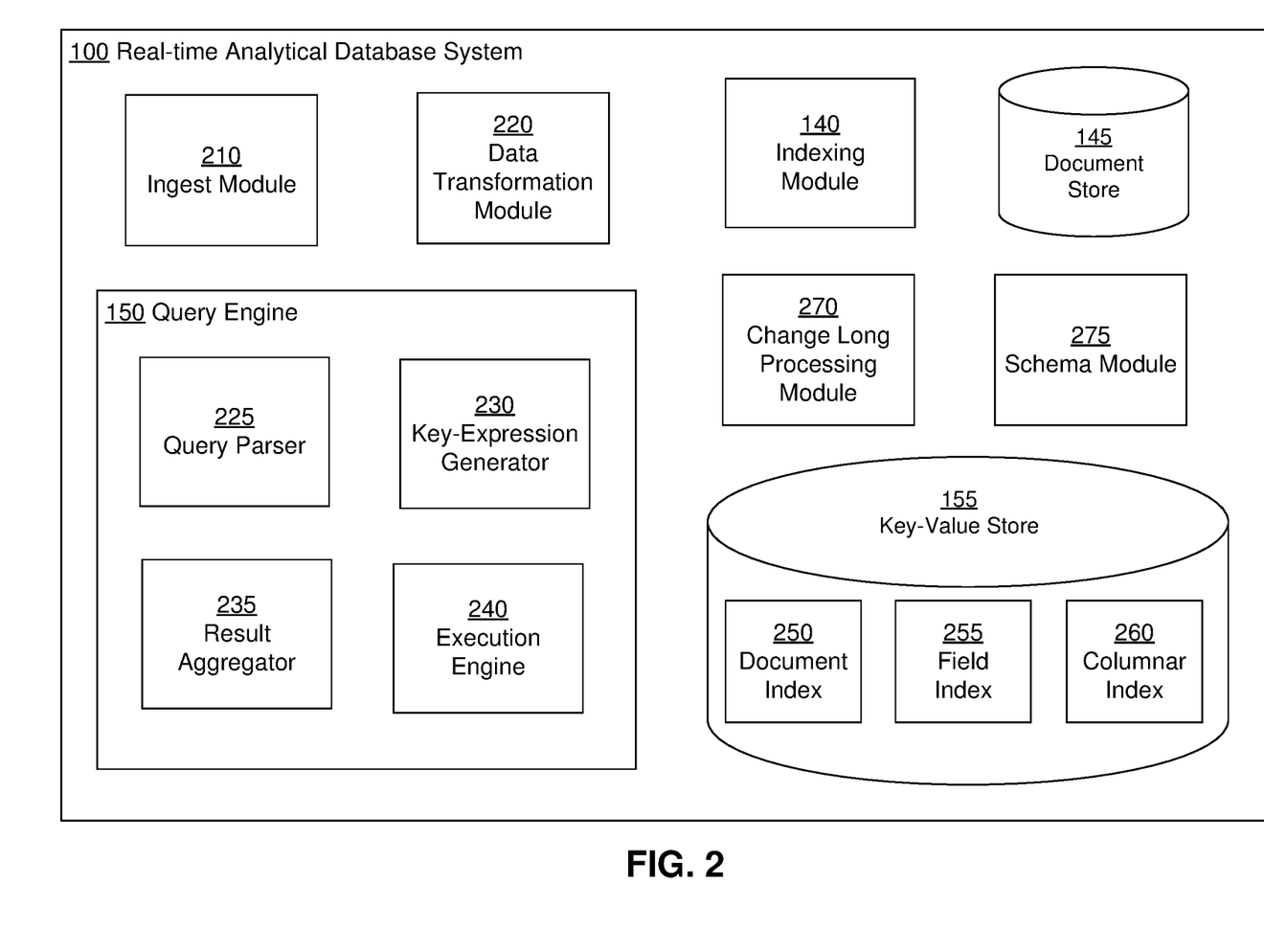
FIG. 2 shows the system architecture of a real-time analytical database system, in accordance with an embodiment.

FIG. 2 shows the system architecture of a real-time analytical database system, in accordance with an embodiment. The real-time analytical database system 100 comprises an ingest module 210, a data transformation module 220, the indexing module 140, the document store 145, the key-value store 155, a change log processing module 270, a schema module 275, and the query engine 150. Other embodiments of the real-time analytical database system 100 may include more of fewer modules.

The ingest module 210 interfaces with external systems that act as sources of data, for example, the transactional system 120, cloud storage systems, or third-party systems. The ingest module 210 receives change logs from the transactional system 120. The change logs correspond to operations performed using data in the transactional system 120. The operations represented by change logs may represent changes to data stored in the transactional system, for example, addition of new records, deletion of existing records, updates of existing records, and so on. The operations represented by change logs may represent schema changes, for example, addition of fields, addition of new tables, dropping of fields or tables, modifications of fields or tables, and so on.

The documents stored in the document store 155 by the ingest module 210 may comprise structured data, unstructured data, or semi-structured data received from external systems. In an embodiment, the ingest module 210 imports multiple records in parallel using multiple processors. The ingest module 210 scales the number of processors used for importing the records based on the number of records that need to be imported.

In an embodiment, each record received by the ingest module 210 has an identifier. The identifier may be stored as a field of the document. The identifier is provided by the source of the record, for example, by the transactional system 120 that provided the document. If the transactional system 120 stores data in a relational database, a record may represent one or more rows of tables stored in the transactional system 120. If the transactional system 120 stores data using a document-oriented store, a record represents a document received from the transactional system 120.

The ingest module 210 converts records received from external systems into documents that are stored in the document store 145. Accordingly, if the ingest module 210 receives a record representing a row of a table, the ingest module 210 generates a document in which each field corresponds to the fields of the row. The ingest module 210 saves the generated document into the document store 145.

The document store 145 stores documents representing records imported by the ingest module 210. The document store 145 acts as a staging area for documents for further processing by the real-time analytical database system 100. In an embodiment, the document store 145 is implemented as a distributed log store that stores logs across a plurality of systems. New documents received by the real-time analytical database system 100 are added to the end of a log. Adding documents to the end of a log is efficient compared to inserting documents in the middle of a file. This is so because adding data in the middle of a file may require moving of existing data in addition to writing the data that was received. In contrast, appending data at the end of a log file can be performed simply by writing the data without requiring any additional data movement. The documents stored in a log are ordered based on the time that each document was added to the log.

The change log processing module 270 processes change logs received by ingest module 210 from the transactional system 120. The change log processing module 270 parses the change logs to identify the operations corresponding to each change log performed by the transactional system 120, for example, adding a record, deleting a record, adding a field, and so on. The change log processing module 270 determines whether the operation corresponding to a change log performed by the transactional system 120 is a data operation or a schema change operation. A data operation modifies the data, for example, by adding records, deleting records, or updating records. A schema change operation modifies the metadata representing the schema defining the structure of the data. For example, if the transactional system 120 stores data in a relational database, a schema change may correspond to adding a new field to a table, deleting a field, adding a table, dropping a table, adding a constraint to one or more tables, and so on.

The change log processing module 270 determines the operations corresponding to the change log that need to be performed in the real-time analytical database system 100 such that the data stored in the real-time analytical database system 100 matches the data stored in the transactional system 120. The change log processing module 270 may modify data of the document store 145 as well as the key-value store 155. Modifying the key-value store 155 based on the changes to the data of the transactional system received via the change logs allow the real-time analytical database system 100 to perform various types of queries including analytics queries on the data.

The change log processing module 270 updates the documents of the document store 145 and the indexes of the key-value store 155 such that the query engine 150 is able to continue processing queries that reflect all changes to the data or metadata without having to shut down or restart the real-time analytical database system 100 or having to rebuild indexes or create new indexes. For example, a user may create a session with the real-time analytical database system 100 to send queries and receive results. Even though the transactional system 120 performs schema change operations, the real-time analytical database system 100 is able to continue processing queries based on the new schema using the same session without requiring the real-time analytical database system 100 to be restarted in view of the schema change operation or without requiring creation of new indexes or rebuilding of existing indexes. In contrast conventional systems require creation of new indexes, for example, if new tables are created. Similarly, conventional systems may require rebuilding of indexes or creation of new indexes if new fields are added to an existing table to allow efficient execution of queries based on the new schema.

The schema module 275 generates and maintains a schema representing the data stored in the real-time analytical database system 100. The schema module 275 may maintain a separate schema for each transactional system 120 that provides data for storing in the real-time analytical database system 100. In an embodiment, the schema module 275 receives a request to determine the schema of the data stored in the key-value store 155 and dynamically generates the schema responsive to receiving the request. The data stored in the key-value store 155 corresponds to the data stored in the document store 145. In some embodiments, the schema module 275 generates a schema and stores it in a schema store (not shown in FIG. 2). The schema module 275 maintains the schema of the schema store by updating the schema as the data stored in the key-value store 155 gets modified. For example, the real-time analytical database system 100 may receive change logs indicating changes to the schema. The schema module 275 may modify the schema based on the information deceived in the change log or based on the changes made to the data stored in the key-value store 155. As an example, the real-time analytical database system 100 may receive change logs indicating that a field is added to a table and accordingly update the schema to add a field to that table. Alternatively, the schema module 275 may determine that a new document is added with a field that was not previously identified and accordingly update the schema to add the field. The schema module 275 maintains different type of information in the schema, for example, the types of data stored in each field, statistics describing the fields, and so on. The schema module 275 may store a plurality of data types for each field, for example, if the field stores data of different data types. The schema module 275 checks the existing data types corresponding to the field when adding or modifying an attribute of a document corresponding to the field. If the new data type is different from any of the existing data types, the schema module 275 adds the data type to the list of data types corresponding to data stored in the field. If the number of data types corresponding to a field is more than one, the schema module 275 modifies the data type for that field to be a mixed type. The schema module 275 may store information describing the plurality of types that are stored in a field with a mixed type. The query engine 150 uses the information describing the data types of each field to optimize queries processing that data. For example, the query engine 150 may determine the amount of storage to be allocated for each field being processed based on the data types of data stored in that field.

The data transformation module 220 transforms documents stored in the document store 145 that may be represented using various formats to a canonical format, i.e., a standardized format for example, JSON format or XML format. In an embodiment, the canonical format represents fields using key-value pairs. For example, the data transformation module 220 may use JSON format as a canonical format and transform documents represented in PDF format or WORD format to JSON format.

In an embodiment, the data transformation module 220 transforms a document from a given format to the canonical format by transforming each field of the document. As an example, an input document may be represented using XML format that comprises various tags. The data transformation module 220 parses the XML document to identify each XML tag of the document and generates a key-value pair corresponding to the XML tag. For example, the key of the key-value pair may be generated based on the name of the XML tag and the value of the key-value pair may be generated based on the data of the XML tag. The data transformation module 220 adds the generated key-value pairs to the transformed document. The conversion of documents to a canonical format simplifies operations such as indexing of the documents since the indexing module 140 need only process a single canonical format.

In some embodiments, the data transformation module 220 transforms the data of a document to anonymize the data, for example, by replacing personally identifiable information with other data. Accordingly, fields comprising email addresses may be modified by replacing the email address with a different string or with a numeric hash value. Similarly, fields storing values such as social security numbers or credit card numbers are modified to store a different value. In these embodiments, even if an input document is available in the canonical format, the data transformation module 220 transforms the data for anonymizing certain fields.

The indexing module 140 processes the transformed documents and adds key-value pairs based on field data extracted from the transformed documents to multiple indexes that are stored in the key-value store 155. The key-value store 155 stores the key-value pairs in a sorted order, for example, in order of alphabetically sorted keys. Each index is associated with an order in which values of field data and document identifier are combined to obtain the keys of the key-value pairs added to the index. The query engine 150 generates key-expressions based on the order in which values are combined and uses the key-expressions to perform prefix searches for specific key-value pairs of that index.

In an embodiment, the key-value store 155 includes a document index 250 configured to allow efficient processing of queries that determine documents that match a given criteria based on field data, a field index 255 configured to allow efficient processing of queries that access fields of a given document, and a columnar index 260 configured to allow efficient processing of queries that aggregate fields of documents. The real-time analytical database system 100 may use multiple indexes to efficiently process a query, for example, both the document index and field index may be used to access a field "A1" from all documents that match a specified criteria based on field "A2". In an embodiment, the ingest module 210 receives a request to store a modified version of a document that was previously imported.

Each index comprises key-value pairs that are stored in the key-value store 155. In an embodiment, the keys corresponding to a particular index include a sub-string that identifies the index. Accordingly, the keys corresponding to the key-value pairs of the document index 250 include a document index identifier, for example, the string "I", the keys corresponding to the key-value pairs of the field index 255 include a field index identifier, for example, string "S", and the keys corresponding to the key-value pairs of the columnar index 260 include a columnar index identifier, for example, string "D".

The document index 250 is an inverted index that allows accessing documents that satisfy certain criteria based on field data. Each key of a key-value pair of the document index 250 is generated by concatenating the following values in the following order: the document index identifier, the field name, the field type, the field value, and the document identifier. Other embodiments may generate the keys by concatenating fewer elements than those listed herein. Furthermore, the elements listed above may be concatenated in an order different from the order listed above to generate the key for the document index 250. For example, the order of the field data may be changed. However, for the document index 250, the field data occurs before the document identifier in the keys. The value of the key-value pair for the document index 250 is empty.

The field index 255 is a forward index that contiguously stores all fields of a document. Each key of a key-value pair of the field index 255 is generated by concatenating the following values in the following order: field index identifier, the document identifier, and the field name. Other embodiments may generate the keys by concatenating fewer elements than those listed herein. Furthermore, the elements listed above may be concatenated in an order different from the order listed above to obtain the key for the field index 255. The value of the key-value pair for the field index 255 is the field value.

The columnar index 260 stores data in columnar fashion by contiguously storing values of the same field across different documents. Each key of a key-value pair of the columnar index 260 is generated by concatenating the following values in the following order: the columnar index identifier, the field name, the field type, and the document identifier. Other embodiments may generate the keys by concatenating fewer elements than those listed herein. Furthermore, the elements listed above may be concatenated in an order different from the order listed above to obtain the key for the columnar index 260. The value of the key-value pair for the columnar index 260 is the field value.

In an embodiment, the key-value store 155 supports various APIs (application programming interfaces) that allow other modules or systems to interact with the key-value store 155. For example, the key-value store 155 supports a seek( ) and a get( ) API. The seek( ) API takes as input a string representing a prefix of keys and positions a read cursor to the first key in the key-value store that has the closest prefix to the input string. The seek( ) operation provides an efficient mechanism to access the appropriate keys in a key-value store. The key-value store stores the key-value pairs in a sorted order of the keys, for example, sorted in a lexicographical, alphabetical, or any other known and predetermined order. Since the key-value pairs are stored in a sorted order, the seek( ) operation is performed using an efficient search technique such as binary search to efficiently locate the matching key. Other embodiments store the sorted key-value pairs using specialized data structures that allow efficient access to values matching a given criteria. A call to the get( ) API following the seek( ) call retrieves the key-value pair at the read cursor and increments the read cursor and positions the read cursor on the next key-value pair. Each subsequent call to the get( ) API returns the key-value pair at the cursor and positions the read cursor on the next key-value pair. Since the key-value store 155 stores keys in a sorted order, the seek( ) and the get( ) APIs can be used to retrieve all keys that match a given prefix expression.

In an embodiment, a document comprises a variable length field. The real-time analytical database system 100 determines a fixed length value representing a location of the variable length field. The real-time analytical database system 100 stores the fixed length value in the key-value store instead of the value of the variable length field. Storing fixed-length data values in the key-value store allows the values to be updated efficiently, without requiring data movement. This is so because updating a variable length field from an old value to a new value may require movement of data to make room for the new value if the new value occupies more space than is currently available for storing the old value.

The query engine 150 receives queries and processes them to identify matching data. The query engine 150 comprises a query parser 225, a key expression generator 230, a result aggregator 235, and an execution engine 240. Other embodiments of the query engine 150 may include more or fewer modules.

The query parser 225 parses a received query to determine various components of the query. The query parser 225 generates a data structure representing the query. The generated data structure allows efficient access to information describing the query. For example, the key-expression generator 230 may access the generated data structure to determine the criteria of the query. In an embodiment, the queries processed by the real-time analytical database system 100 are based on the structured query language (SQL).

The key expression generator 230 generates an expression based on the parsed query for accessing key-value store 155. Each index is associated with a particular order in which field data is combined to generate keys for the index. The key expression generator 230 generates expressions by combining field data and/or document identifiers in the order associated with an index to access data stored in the index.

The execution engine 240 executes the query. In an embodiment, the query engine 150 generates an execution plan corresponding to a query and the execution engine 240 executes the execution plan. The result aggregator 235 aggregates the results of the query and optionally ranks them results.

Processing Change Logs Received from Transactional System

Figure 3:
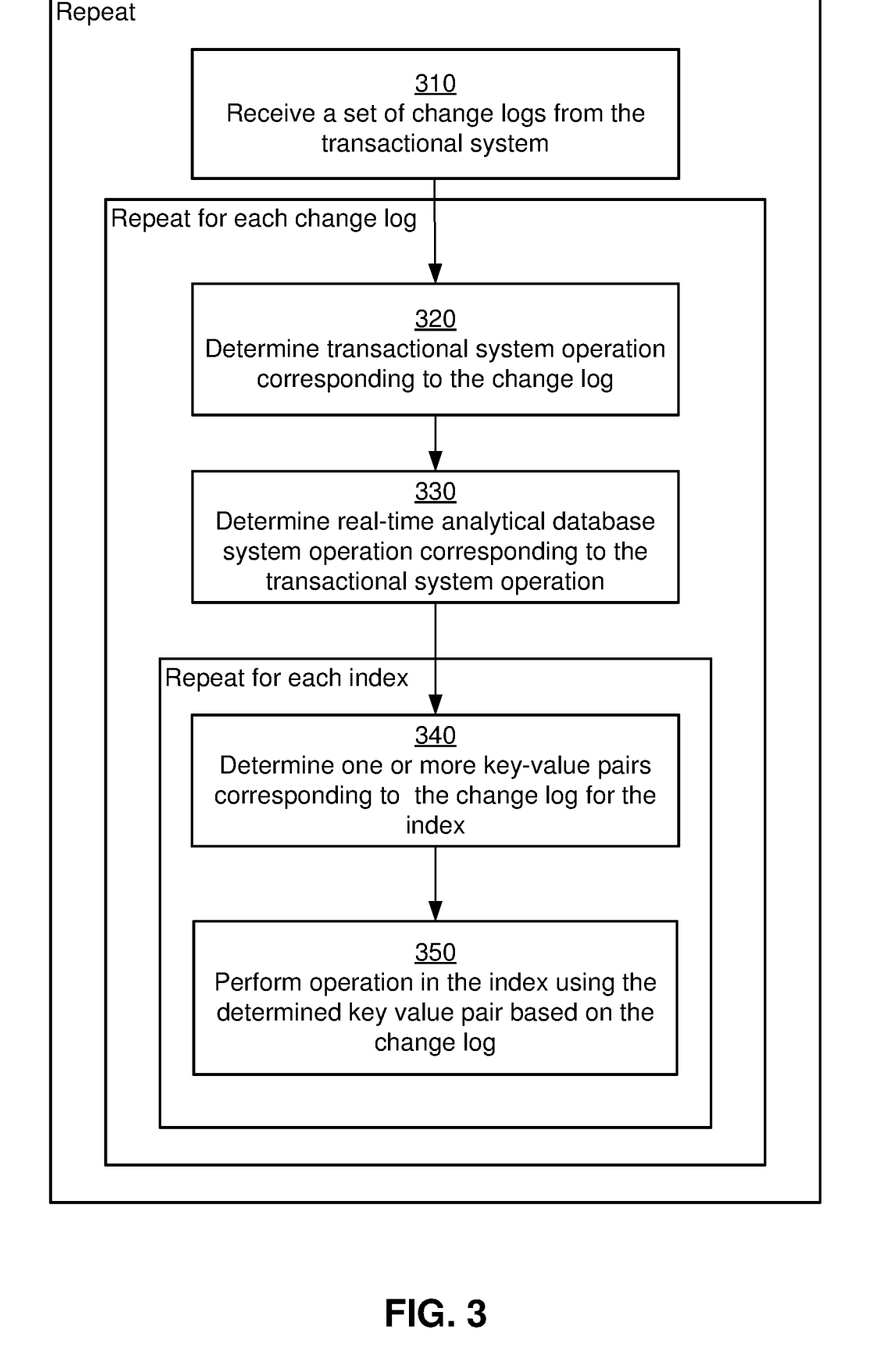
FIG. 3 is a flowchart of the process of receiving change logs from a transactional system and processing them to perform analytics queries based on the data, in accordance with an embodiment.
Figure 4:
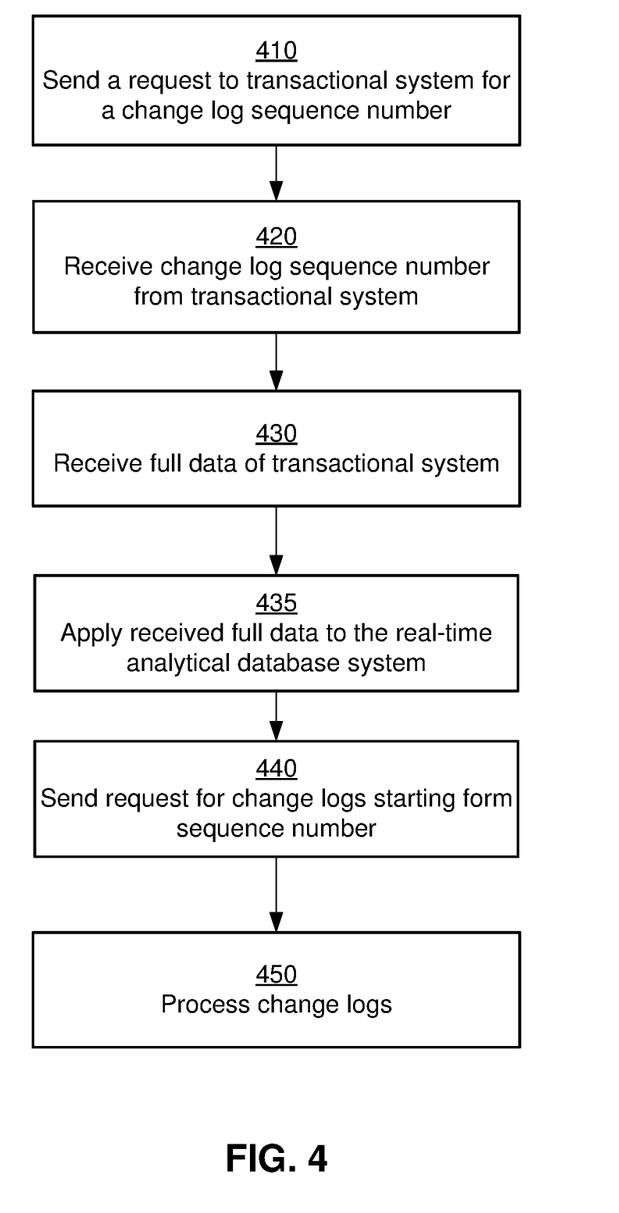
FIG. 4 shows a flowchart illustrating the process for performing bulk import of data of a transactional system by the real-time analytical database system, according to an embodiment.
Figure 5:
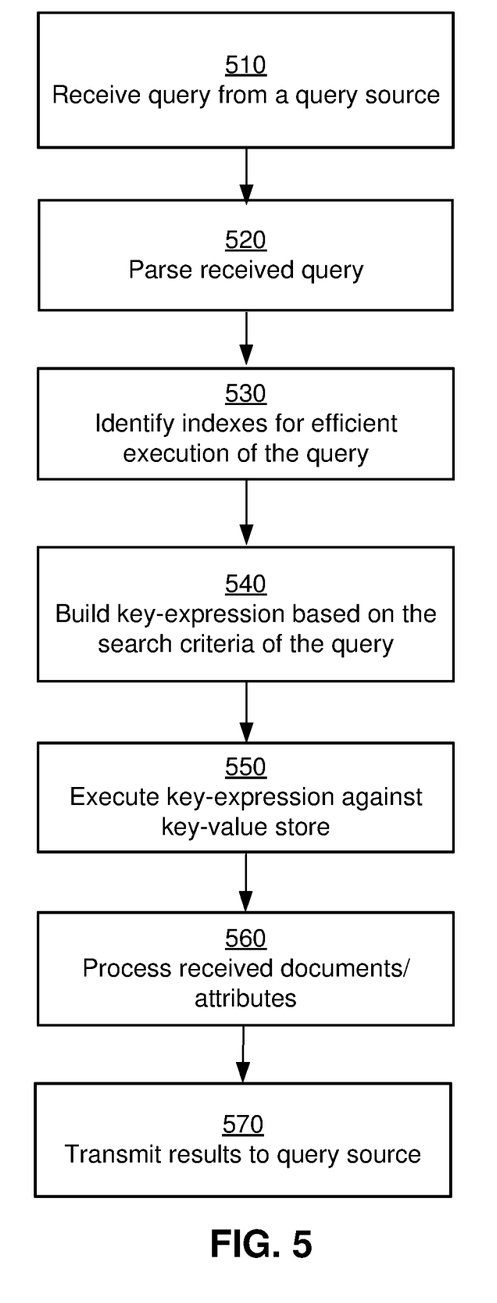
FIG. 5 shows a flowchart of the process for executing queries in the real-time analytical database system using the indexes, in accordance with an embodiment.

FIGS. 3-5 describe various processes associated with the real-time analytical database system 100. The steps shown in these processes can be executed in an order different from those shown in the flowcharts. Furthermore, various steps can be executed by module other than those indicated herein.

FIG. 3 is a flowchart of the process of receiving change logs from a transactional system and processing them to perform analytics queries based on the data, in accordance with an embodiment. The real-time analytical database system 100 receives 310 change logs from the transactional system. The real-time analytical database system 100 may receive the change logs on a periodic basis, for example, every few minutes or every few seconds. The transactional system 120 may send change logs if more than a threshold number of operations are performed on the data. Each set of change logs may comprise one or more change logs, each change log corresponding to an operation performed by the transactional system 120.

For each change log of the set of change logs received, the real-time analytical database system 100 performs the following steps. The real-time analytical database system 100 parses the change log to determine 320 the operation performed by the transactional system 120 corresponding to the change log. The real-time analytical database system 100 determines 330, the operation that the real-time analytical database system 100 needs to perform corresponding to the transactional system operation to modify the data stored in the document store 145 and the key-value store 155 to match the data of the transactional system 120. Accordingly, for each index of the key-value store 155, the real-time analytical database system 100 determines 340 a key-value pair corresponding to the change log for the index. The real-time analytical database system 100 performs 350 an operation in the index using the key value pair corresponding to the change log.

For example, assume that the transactional system 120 is a relational database and a change log corresponds to an insert operation that adds a row to a table. The real-time analytical database system 100 generates a document corresponding to the received row of data. The generated document has a canonical representation, for example, a JSON representation. The real-time analytical database system 100 determines a key-value pair corresponding to each field of the row that is added and adds the key-value pair to an index. The real-time analytical database system 100 repeats this operation for each index.

If the transactional system 120 is a document oriented database, the change logs represent changes to records in the transactional system 120. For example, if the change log represents a new document being added in the transactional system 120, the real-time analytical database system 100 may convert the received document to a canonical representation, for example, a JSON representation. The real-time analytical database system 100 adds or modifies a document corresponding to the record of the change log in the document store 145. The real-time analytical database system 100 determines a key-value pair corresponding to each field of the document that is added/modified and adds/modifies the key-value pair of each index. The real-time analytical database system 100 repeats this operation for each index.

The indexing module 140 generates a key for the document index 250 by combining the following values in the following order: field name, the field type, the field value, and a document identifier identifying the document. The indexing module 140 stores an empty value or any dummy value as the value of the key-value pair added to the document index 250. The indexing module 140 generates the key for the field index 255 by combining the following values in the following order: the document identifier and the field name. The indexing module 140 stores the field value as the value of the key-value pair added to the field index 255. The indexing module 140 generates a key for the columnar index 260 by combining the following values in the following order: field name, the field type, and the document identifier. The indexing module 140 stores the field value as the value of the key-value pair added to the columnar index 260.

If the change log corresponds to updating a record, for example, updating a value of a field in a row of a table, the real-time analytical database system 100 identifies a document corresponding to the row based on the index of the row. The real-time analytical database system 100 repeats the following steps for each modified field and for each index. The indexing module 140 determines a key-value pair based on the modified field value. The indexing module 140 updates the key-value pair of the index based on the determined key-value pair. Accordingly, the real-time analytical database system 100 patches the record with the new values of the fields as indicated by the update command.

In some embodiments, if the change log corresponds to updating a record, the real-time analytical database system 100 determines the identifier of the record being updated. The real-time analytical database system 100 deletes all the key-value pairs corresponding to the record as identified by the identifier. The real-time analytical database system 100 adds key-value pairs corresponding to the new fields of the updated record. The real-time analytical database system 100 may decide based on the size of the record whether to delete the key-value pairs of the record and add new key-value pairs or to patch the key-value store by modifying the values of the existing key-value pairs. Accordingly, if the record has more than a threshold amount of data (or more than a threshold number of fields), the real-time analytical database system 100 patches the data of the key-value store by modifying the values of the existing key-value pairs. If the record has less than the threshold amount of data (or less than a threshold number of fields), the real-time analytical database system 100 deletes the existing key-value pairs and adds new key-value pairs corresponding to the updated record.

In some embodiments, the change log simply identifies the fields of the updated record that have changed rather that provide the complete modified record. In this situation, the real-time analytical database system 100 can only patch the data of the key-value store by modifying the values of the existing key-value pairs. If the change log provides the entire modified record including all fields whether or not the field has changed, the real-time analytical database system 100 can either identify the fields that have changed by comparing with existing field values and patch the key-value store or the real-time analytical database system 100 may delete all existing key-value pairs for the record and insert new key-value pairs based on the modified record.

The real-time analytical database system 100 performs efficient updates of the indexes based on updates performed in the transactional system. Accordingly, the real-time analytical database system 100 updates an index by simply updating the key-value pairs of fields that were modified. In contrast, conventional systems may rebuild an entire index if one or more documents are modified. Rebuilding an entire index can be a slow process. In particular, if documents are modified frequently, these systems either delay the index rebuilding process, thereby using outdated data in the indexes or require large amount of computing resources to update the indexes. In contrast, the disclosed embodiments efficiently update the indexes without consuming significant resources, even if documents are modified frequently.

If the change log corresponds to a delete operation that deletes a row of a table, the real-time analytical database system 100 identifies a document corresponding to the deleted row based on the index of the row. For each index, the real-time analytical database system 100 determines key-value pairs corresponding to each field of the row that is deleted and deletes them from to the index. The real-time analytical database system 100 repeats this operation for each index.

The change logs representing operations performed in the transactional system may represent schema changes, for example, addition/deletion of fields or tables or modifications of tables in the transactional system. In an embodiment, the schema module 275 modifies a representation of the schema based on the schema change described in the change log. For example, if the schema change operation adds a table or drops a table, the schema module 275 modifies the schema accordingly. In an embodiment, if the schema change operation specifies a drop table operation, the real-time analytical database system 100 updates the schema but performs the actual drop operation at a later stage. For example, the real-time analytical database system 100 may delete all keys from the key-value store corresponding to the records of the table.

In an embodiment, the real-time analytical database system 100 stores a flag indicating that the stored schema represents the latest schema instead of the data of the key-value store. Accordingly, the real-time analytical database system 100 verifies queries against the stored schema before executing them. The real-time analytical database system 100 verifies the queries to determine whether the query refers to fields that are valid. Once the key-value store is updated to conform to the stored schema, the real-time analytical database system 100 resets the flag. Accordingly, the real-time analytical database system 100 is not required to perform verification of the queries against the stored schema and is able to execute them directly using the key-value store.

Bulk Import Process

FIG. 4 shows a flowchart illustrating the process for performing bulk import of data of a transactional system by the real-time analytical database system, according to an embodiment. The real-time analytical database system 100 receives information identifying a transactional system 120 for which data need to be queried. It is assumed that the real-time analytical database system 100 has not received data from the transactional system 120 previously or that the real-time analytical database system 100 has not received sufficient data from the transactional system 120 to be able to perform queries such as analytical queries.

The real-time analytical database system 100 sends 410 a request to the transactional system 120 to provide a change log sequence number. The change log sequence number identifies a change log such that any external system can invoke an API to request all change logs starting from the change log sequence number. The transactional system 120 may not be able to provide change logs that were generated before the change log corresponding to the change log sequence number. The real-time analytical database system 100 receives 420 the change log sequence number from the transactional system 120.

After obtaining the change log sequence number, the real-time analytical database system 100 extracts the full data of the transactional system 120. The real-time analytical database system 100 may execute queries to identify all the data stored in the transactional system 120. The real-time analytical database system 100 retrieves the identified data using APIs supported by the transactional system 120. The real-time analytical database system 100 ensures that the full data of the transactional system 120 is retrieved 430 after the change log sequence number is obtained from the transactional system 120. The real-time analytical database system 100 applies 435 the full data received to the document store and the key-value store.

After the real-time analytical database system 100 applies 435 the full data of the transactional system 120, the real-time analytical database system 100 sends request to start receiving change logs starting from the change log sequence number. Accordingly, the real-time analytical database system 100 periodically retrieves change logs representing operations performed in the transactional system after the operation represented by the change log corresponding to the change log sequence number. The real-time analytical database system 100 processes the received change logs as described in connection with the flowchart illustrated in FIG. 5.

It is possible that the bulk import of data from the transactional system obtains data that has been modified by operations performed after the operation represented by the change log corresponding to the change log sequence number. The change logs are assumed to represent operations that are idempotent. Accordingly, even if the operations of some of the change logs are performed twice as a result of applying the change logs to the imported data, the data of the transactional system remains unchanged. This allows the real-time analytical database system to perform the bulk import process to obtain the data of the transactional system accurately.

In an embodiment, the change log processing module 270 periodically stores a change log sequence number in the key-value store 155 using a system key. This allows the real-time analytical database system 100 to track the state of the stored data over time. Accordingly, if the real-time analytical database system 100 restarts after a crash, it retrieves the system key that stores the change log sequence number. The real-time analytical database system 100 applies the change logs starting from the retrieved change log sequence number. This ensures that the change log sequence number does not lose any information after crashes. Also, it is possible that the change log sequence number may have completed execution of some transactions since the change log sequence number was stored in the system key. However, the idempotent nature of the change logs ensures that the result of applying the log is the same, whether or not any transactions were executed since the change log sequence number before crash.

Processing Queries

FIG. 5 shows a flowchart of the process for executing queries using the indexes, in accordance with an embodiment. The query engine 150 receives 510 a query from a query source, for example, a client application 115 executing on a client device 110. The query requests information stored in the documents stored in the document store 145 and comprises a criteria. The query engine 150 identifies documents that match the criteria and extracts the requested information for providing to the query source. For example, the criteria may specify a particular value of a field having a particular field name. Accordingly, query engine 150 identifies all documents that have a matching value of the field having the particular field name. Alternatively, the criteria may specify a particular value of a field having a particular field name and a particular field type. Accordingly, query engine 150 identifies all documents that have a matching value of the field having the particular field name provided the field also has the particular field type.

The query parser 225 parses 520 the received query. The query parser 225 builds a data structure by parsing the query, for example, a parse tree data structure. Various modules of the query engine 150 use the data structure for processing the query. For example, the query engine 150 may use the parse tree to determine various components of the query, for example, the criteria, the requested fields, and so on. In the query engine 150 determines a type of the query based on the information specified by the query, for example, the criteria specified by the query and the type of information requested by the query. Examples of types of queries include: queries that request documents matching a specified criteria based on field data, for example, a query requesting documents having a specified value of a specified type for a specified field; queries that request fields of a given document; queries that request fields of all documents that match a given criteria; or queries that request an aggregate of a specified field of a specified field type across matching documents.

The key-expression generator 230 identifies 530 the indexes that are relevant to the query based on the type of query and builds 540 key-expressions based on the criteria of the query. The key-expression generator 230 builds a key-expression for each type of index that may be used for efficient execution of the query. The execution engine 240 executes 550 the key-expression against the identified indexes stored in the key-value store to identify matching key-value pairs. The execution engine 240 extracts the requested information from the matching key-value pairs. The requested information may be stored as a value of the key-value pair. Alternatively, the requested information may be stored as a portion of the key. For example, if the key is generated by combining the field name, field type, and field value, and the requested information is the field value, the query engine 150 separates the different elements of the key and returns the field value.

Following are examples illustrating how the query engine 150 processes different types of queries. If the query is of a query type that requests documents having a specified value of a specified type for a specified field, the query engine 150 generates a key-expression by combining the specified field name, the specified field type, and the specified field value. The query engine 150 uses the document index to retrieve key-value pairs matching the key-expression and identifies documents corresponding to the matching key-value pairs.

If the query is of a query type that requests fields of a given document specified by a document identifier, the query engine 150 builds a key-expression that comprises the specified document identifier. The query engine 150 uses the field index to retrieve key-value pairs matching the key-expression and accesses the requested fields of the documents corresponding to the matching key-value pairs.

If query is of the query type that requests fields of all documents that match a given criteria, the query engine 150 uses the document index to identify the documents that match the criteria and uses the field index to fetch requested fields of each of the matching document.

If query is of the query type that requests an aggregate of a specified field of a specified field type across matching documents, the query engine 150 builds a key-expression by combining the specified field name and the specified field type. The query engine 150 uses the columnar index 260 to retrieve the key-value pairs matching the key-expression and aggregates the values of the retrieved key-value pairs.

The result aggregator 235 collects data of matching documents for sending to the query source. The query engine 150 transmits 570 the results of execution of the query to the query source.

Architecture of Computer

Figure 6:
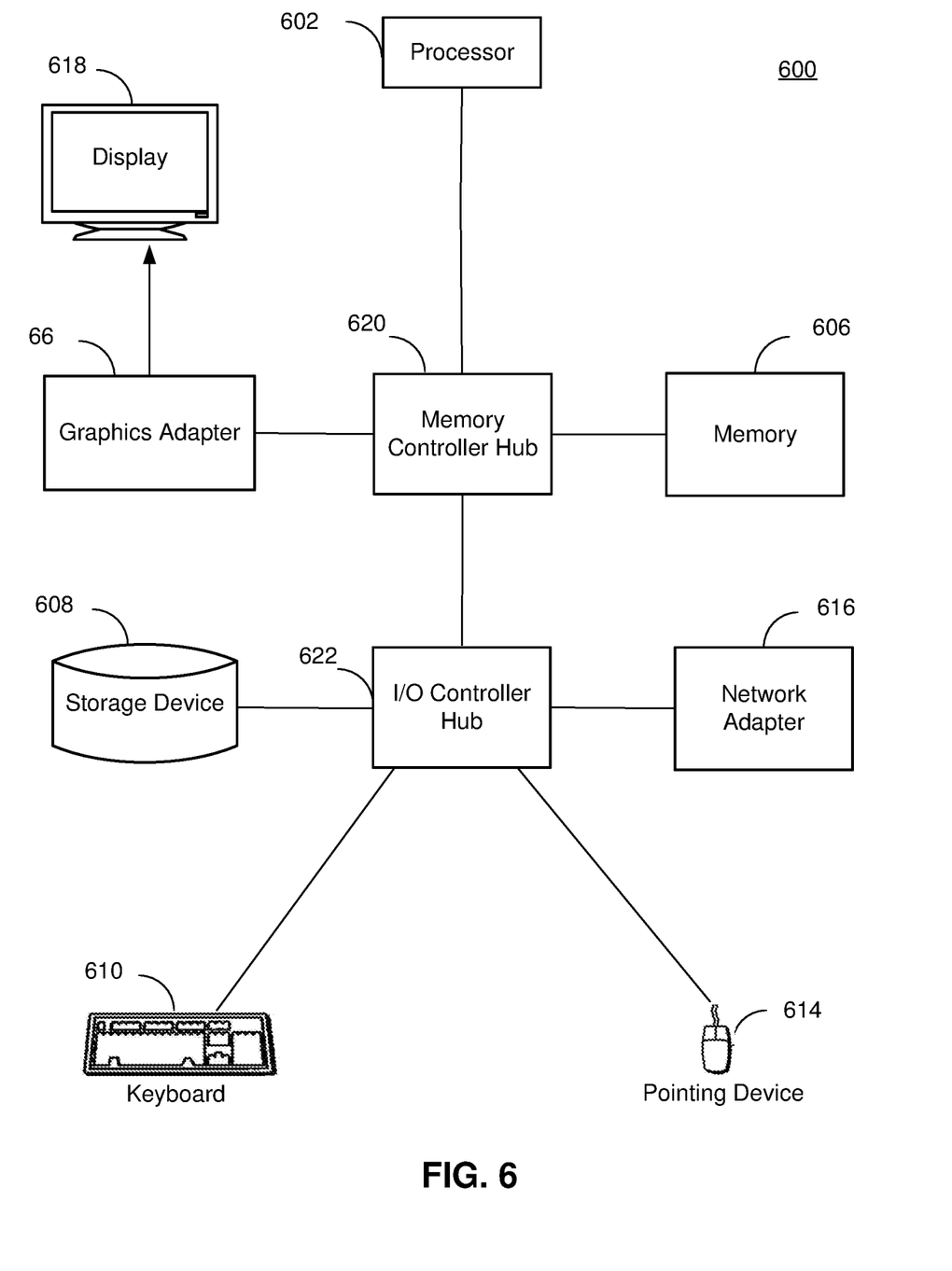
FIG. 6 is a high-level block diagram illustrating an example of a computer for use as one or more of the systems illustrated in FIG. 1, according to one embodiment.

FIG. 6 is a high-level block diagram illustrating an example of a computer 600 for use as one or more of the systems illustrated in FIG. 1, according to one embodiment. Illustrated are at least one processor 602 coupled to a memory controller hub 620, which is also coupled to an input/output (I/O) controller hub 622. A memory 606 and a graphics adapter 612 are coupled to the memory controller hub 622, and a display device 618 is coupled to the graphics adapter 612. A storage device 608, keyboard 610, pointing device 614, and network adapter 616 are coupled to the I/O controller hub. The storage device may represent a network-attached disk, local and remote RAID, or a SAN (storage area network). A storage device 608, keyboard 610, pointing device 614, and network adapter 616 are coupled to the I/O controller hub 622. Other embodiments of the computer 600 have different architectures. For example, the memory is directly coupled to the processor in some embodiments, and there are multiple different levels of memory coupled to different components in other embodiments. Some embodiments also include multiple processors that are coupled to each other or via a memory controller hub.

The storage device 608 includes one or more non-transitory computer-readable storage media such as one or more hard drives, compact disk read-only memory (CD-ROM), DVD, or one or more solid-state memory devices. The memory holds instructions and data used by the processor 602. The pointing device 614 is used in combination with the keyboard to input data into the computer 600. The graphics adapter 612 displays images and other information on the display device 618. In some embodiments, the display device includes a touch screen capability for receiving user input and selections. One or more network adapters 616 couple the computer 600 to a network. Some embodiments of the computer have different and/or other components than those shown in FIG. 6. For example, the database system can be comprised of one or more servers that lack a display device, keyboard, pointing device, and other components, while a client device acting as a requester can be a server, a workstation, a notebook or desktop computer, a tablet computer, an embedded device, or a handheld device or mobile phone, or another type of computing device. The requester to the database system also can be another process or program on the same computer on which the database system operates.

The computer 600 is adapted to execute computer program modules for providing functionality described herein. As used herein, the term "module" refers to computer program instructions and/or other logic used to provide the specified functionality. Thus, a module can be implemented in hardware, firmware, and/or software. In one embodiment, program modules formed of executable computer program instructions are stored on the storage device, loaded into the memory, and executed by the processor.

ADDITIONAL CONSIDERATIONS

The foregoing description of the embodiments of the invention has been presented for the purpose of illustration; it is not intended to be exhaustive or to limit the invention to the precise forms disclosed. Persons skilled in the relevant art can appreciate that many modifications and variations are possible in light of the above disclosure.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a tangible computer readable storage medium or any type of media suitable for storing electronic instructions, and coupled to a computer system bus. Furthermore, any computing systems referred to in the specification may include a single processor or may be architectures employing multiple processor designs for increased computing capability.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention.

What is claimed is:

1. A computer-implemented method for processing queries on data being updated by transactions, the method comprising:
   receiving, by a real-time analytical database system, from a transactional system, a set of change logs representing operations performed on data stored in the transactional system;
   repeating, by the real-time analytical database system, for each change log from the set of change logs:
      determining an operation of the transactional system represented by the change log;
      determining one or more key-value pairs corresponding to the determined operation;
      updating a plurality of indexes stored in a key-value store, each index associated with a set of attributes selected from: (1) a document identifier attribute, (2) a field name attribute, (3) a field value attribute, and (4) a field type attribute, the set of attributes combined for obtaining keys of key-value pairs of the index, the updating performed using the one or more key-value pairs, the plurality of indexes comprising:
         a document index configured to identify documents matching a criteria based on fields;
         a field index configured to access fields of a given document; and a columnar index configured to determine aggregate values associated with fields;

receiving, by the real-time analytical database system, from a query source, a query requesting information of the transactional system, the query specifying a criteria;

selecting an index from the plurality of indexes for processing the query based on a type of the query, the selected index associated with a particular set of attributes;

generating a key-expression by combining the particular set of attributes corresponding to the selected index;

accessing the requested information using the selected index, the accessing comprising identifying key-value pairs matching the key-expression; and transmitting the accessed information to the query source.

2. The computer-implemented method of claim 1, wherein the determined operation of the transactional system inserts a record, the record comprising one or more fields, each field having a field name, a field type, and a field value, the method further comprising:

updating the plurality of indexes based on the one or more fields of the record.

3. The computer-implemented method of claim 2, wherein updating the plurality of indexes comprises, for each field, storing a key-value pair in the document index, wherein the field has a field name, a field type, and a field value, the key-value pair comprising:

a key obtained by combining the field name, the field type, the field value, and an identifier identifying the record.

4. The computer-implemented method of claim 2, wherein updating the plurality of indexes comprises, for each field having a field name, a field type, and a field value, storing a key-value pair in the columnar index, the key-value pair comprising, a key obtained by combining the field name, the field type, and the document identifier, and a value representing the field value.

5. The computer-implemented method of claim 2, wherein updating the plurality of indexes comprises, for each field having a field name, a field type, and a field value, storing a key-value pair in the field index, the key-value pair comprising:

a key obtained by combining the document identifier and the field name, and a value representing the field value.

6. The computer-implemented method of claim 1, wherein the query requests documents having a specified value of a specified field type for a specified field name, wherein the key-expression is obtained by combining the specified field name, the specified field type, and the specified field value, wherein accessing the requested information comprises:

identifying key-value pairs matching the key-expression using the document index; and identifying one or more documents corresponding to the matching key-value pairs.

7. The computer-implemented method of claim 1, wherein the query requests one or more fields of a document and the criteria specifies a document, wherein the key-expression comprises a document identifier for the specified document, wherein accessing the requested information comprises:

identifying key-value pairs matching the key-expression using the field index; and accessing one or more fields of the document from the matching key-value pairs.

8. The computer-implemented method of claim 1, wherein the query requests an aggregate of a field of a specified field name having a specified field type across a set of documents, wherein the key-expression is obtained by combining the specified field name and the specified field type, wherein accessing the requested information comprises:

identifying key-value pairs matching the key-expression using the columnar index; and aggregating the values of the identified key-value pairs.

9. The computer-implemented method of claim 1, wherein the determined operation of the transactional system updates a field of a record with a new field value, the field having a field name, the record having an identifier:

updating the key-value pairs of the key-value store corresponding to the updated field with the new field value.

10. The computer-implemented method of claim 1, wherein the determined operation of the transactional system updates a field of a record with a new field value, the field having a field name, the record having an identifier, the method further comprising:

deleting one or more existing key-value pairs of the key-value store corresponding to the updated field; and adding one or more new key-value pairs to the key-value store corresponding to the updated field with the new field value.

11. The computer-implemented method of claim 1, further comprising:

receiving, from the transactional system, a change log sequence number associated with a change log; and responsive to receiving the change log sequence number, performing a bulk import of data of the transactional system;

sending a request to receive change logs starting from the change log sequence number; and processing the received change logs.

12. A non-transitory computer readable storage medium storing instructions that when executed by a processor, cause the processor to perform steps comprising:

receiving, by a real-time analytical database system, from a transactional system, a set of change logs representing operations performed on data stored in the transactional system;

repeating, by the real-time analytical database system, for each change log from the set of change logs:

determining an operation of the transactional system represented by the change log;

determining one or more key-value pairs corresponding to the determined operation;

updating a plurality of indexes stored in a key-value store, each index associated with a set of attributes selected from: (1) a document identifier attribute, (2) a field name attribute, (3) a field value attribute, and (4) a field type attribute, the set of attributes combined for obtaining keys of key-value pairs of the index, the updating performed using the one or more key-value pairs;

receiving, by the real-time analytical database system, from a query source, a query requesting information of the transactional system, the query specifying a criteria;

selecting an index from the plurality of indexes for processing the query based on a type of the query, the selected index associated with a particular set of attributes;

generating a key-expression by combining the particular set of attributes corresponding to the selected index;

accessing the requested information using the selected index, the accessing comprising identifying key-value pairs matching the key-expression; and transmitting the accessed information to the query source.

13. The non-transitory computer readable storage medium of claim 12, wherein the plurality of indexes comprise:

a document index configured to identify documents matching a criteria based on fields;

a field index configured to access fields of a given document; and a columnar index configured to determine aggregate values associated with fields.

14. The non-transitory computer readable storage medium of claim 13, wherein the determined operation of the transactional system inserts a record, the record comprising one or more fields, each field having a field name, a field type, and a field value, the instructions further causing the computer processor to perform:

updating the plurality of indexes based on the one or more fields of the record.

15. The non-transitory computer readable storage medium of claim 14, wherein updating the plurality of indexes comprises, for each field, storing a key-value pair in the document index, wherein the field has a field name, a field type, and a field value, the key-value pair comprising:

a key obtained by combining the field name, the field type, the field value, and an identifier identifying the record.

16. The non-transitory computer readable storage medium of claim 13, wherein updating the plurality of indexes comprises, for each field having a field name, a field type, and a field value, storing a key-value pair in the columnar index, the key-value pair comprising, a key obtained by combining the field name, the field type, and the document identifier, and a value representing the field value.

17. The non-transitory computer readable storage medium of claim 13, wherein updating the plurality of indexes comprises, for each field having a field name, a field type, and a field value, storing a key-value pair in the field index, the key-value pair comprising:

a key obtained by combining the document identifier and the field name, and a value representing the field value.

18. The non-transitory computer readable storage medium of claim 13, wherein the query requests documents having a specified value of a specified field type for a specified field name, wherein the key-expression is obtained by combining the specified field name, the specified field type, and the specified field value, wherein accessing the requested information causes the processor to perform steps comprising:

identifying key-value pairs matching the key-expression using the document index; and identifying one or more documents corresponding to the matching key-value pairs.

19. The non-transitory computer readable storage medium of claim 13, wherein the query requests one or more fields of a document and the criteria specifies a document, wherein the key-expression comprises a document identifier for the specified document, wherein accessing the requested information causes the processor to perform steps comprising:

identifying key-value pairs matching the key-expression using the field index; and accessing one or more fields of the document from the matching key-value pairs.

20. The non-transitory computer readable storage medium of claim 13, wherein the query requests an aggregate of a field of a specified field name having a specified field type across a set of documents, wherein the key-expression is obtained by combining the specified field name and the specified field type, wherein accessing the requested information causes the processor to perform steps comprising:

identifying key-value pairs matching the key-expression using the columnar index; and aggregating the values of the identified key-value pairs.

21. The non-transitory computer readable storage medium of claim 12, wherein the stored instructions further cause the processor to perform steps comprising:

receiving, from the transactional system, a change log sequence number associated with a change log; and responsive to receiving the change log sequence number, performing a bulk import of data of the transactional system;

sending a request to receive change logs starting from the change log sequence number; and processing the received change logs.

22. A computer system comprising:

one or more processors; and a non-transitory computer readable storage medium storing instructions for execution by the one or more processors, the instructions for:

receiving, by a real-time analytical database system, from a transactional system, a set of change logs representing operations performed on data stored in the transactional system;

repeating, by the real-time analytical database system, for each change log from the set of change logs:

determining an operation of the transactional system represented by the change log;

determining one or more key-value pairs corresponding to the determined operation;

updating a plurality of indexes stored in a key-value store, each index associated with a set of attributes selected from: (1) a document identifier attribute, (2) a field name attribute, (3) a field value attribute, and (4) a field type attribute, the set of attributes combined for obtaining keys of key-value pairs of the index, the updating performed using the one or more key-value pairs;

receiving, by the real-time analytical database system, from a query source, a query requesting information of the transactional system, the query specifying a criteria;

selecting an index from the plurality of indexes for processing the query based on a type of the query, the selected index associated with a particular set of attributes;

generating a key-expression by combining the particular set of attributes corresponding to the selected index;

accessing the requested information using the selected index, the accessing comprising identifying key-value pairs matching the key-expression; and transmitting the accessed information to the query source.

* * * * *